May 8, 1962     D. E. CLARK     3,033,491

INLET FOR VERTICAL TAKE-OFF AIRCRAFT

Filed Aug. 4, 1960

INVENTOR.
DONALD E. CLARK
BY
John F. Cullen
ATTORNEY

United States Patent Office 3,033,491
Patented May 8, 1962

3,033,491
INLET FOR VERTICAL TAKE-OFF AIRCRAFT
Donald E. Clark, Cincinnati, Ohio, assignor to General
Electric Company, a corporation of New York
Filed Aug. 4, 1960, Ser. No. 47,425
12 Claims. (Cl. 244—23)

This invention relates to an inlet for a vertical thrust fan of an aircraft designed for both vertical and horizontal flight, and more particularly, to an inlet for such an aircraft wherein optimum performance of the inlet is made possible in all aspects of flight including the transition from vertical flight to forward flight.

In vertical take-off aircraft in which fans for providing vertical lift are disposed in the wing or fuselage, and mounted on an axis of rotation fixed in the direction of vertical flight, the problem exists of devising an inlet which provides optimum air flow through the fan duct for both vertical take-off from a stationary condition and for the transition from vertical to horizontal or forward flight. For strictly vertical take-off, the configuration of the inlet duct does not have to allow for a change of direction of the air drawn into the fan duct. For the transition from vertical flight to horizontal flight, and vice versa, the inlet must be capable of receiving high velocity air flowing over wing or fuselage surfaces, and subjecting it to a sudden substantially right-angle change of direction into the fan axis. In making this sudden change of direction, air has a tendency to separate from the upstream or leading wall of the duct, leaving a relatively low pressure or low density area in the vicinity of that portion of the wall, and causing consequent losses of effective inlet flow and distortion of the velocity field in the fan duct. These effects are, of course, deleterious to fan performance.

It is well known that drawing air into an inlet with a change of flow direction, is best accomplished by providing the inlet with a bellmouth having a gradual curve, or in other words, a radius of curvature which is relatively large. This may be expressed in terms of a ratio, hereinafter referred as a "bellmouth radius ratio," and represented by the ratio of the radius of curvature of the bellmouth to the diameter of the inlet. Thus, an inlet having a bellmouth ratio of 50 percent can more easily draw air into it than can an inlet having a bellmouth ratio of, say, 10 percent. In the example of a fan, with its axis at an angle to the forward direction of flight, for vertical take-off aircraft, air flowing horizontally over an air frame surface which must be turned vertically downward into an inlet can better be made to adhere to the walls of the inlet when the bellmouth offers a gradual turn than when it offers a sudden or abrupt turn. Difficulty arises in inlet design, however, when the environment of the fan and inlet places a limit upon the magnitude of the bellmouth ratio. For example, location of the fan inlet in a wing of usual thickness would make it necessary, because of the small wing thickness, to have a bellmouth radius ratio so small (6–15%) that severe distortion and separation would occur in flight. The environment of this invention is contemplated as an inlet in which the maximum bellmouth ratio is substantially not greater than 25 percent.

The object of this invention is to provide an improved fan duct inlet for vertical take-off aircraft.

Another object of the invention is to provide an inlet for a fan duct of a vertical take-off aircraft which provides satisfactory air flow through the duct when the aircraft is stationary or in vertical flight, as well as when the aircraft is in forward motion or transition from vertical to horizontal motion with a high velocity air stream flowing over the inlet surface.

Another object of this invention is to provide an inlet for a fan duct of a vertical take-off aircraft which prevents separation of the air flow from the walls of the inlet with its resultant deleterious effects upon fan performance.

Briefly, and in accordance with one aspect of the invention, a vane is provided in combination with an inlet having a bellmouth of given configuration. This vane is of substantially semi-circular shape and conforms generally with the curvature of the inlet bellmouth. The vane is located in the portion of the bellmouth which leads in the direction of forward flight. The trailing edge of the vane extends downwardly into the inlet, so that during forward flight of the aircraft, this vane directs air flowing horizontally across the top of the vertical inlet downwardly into the inlet, and prevents the separation of the air from the walls of the inlet duct.

Further objects, features and attending advantages of the invention will be apparent by reference to the following specification and drawing, in which.

For purposes of the present description and claims, forward flight is understood to be in the direction of the leading edge of a fixed wing, while vertical flight is understood to be in the direction of the fan axis, which is generally perpendicular to the plane of the wing.

Figure 1:
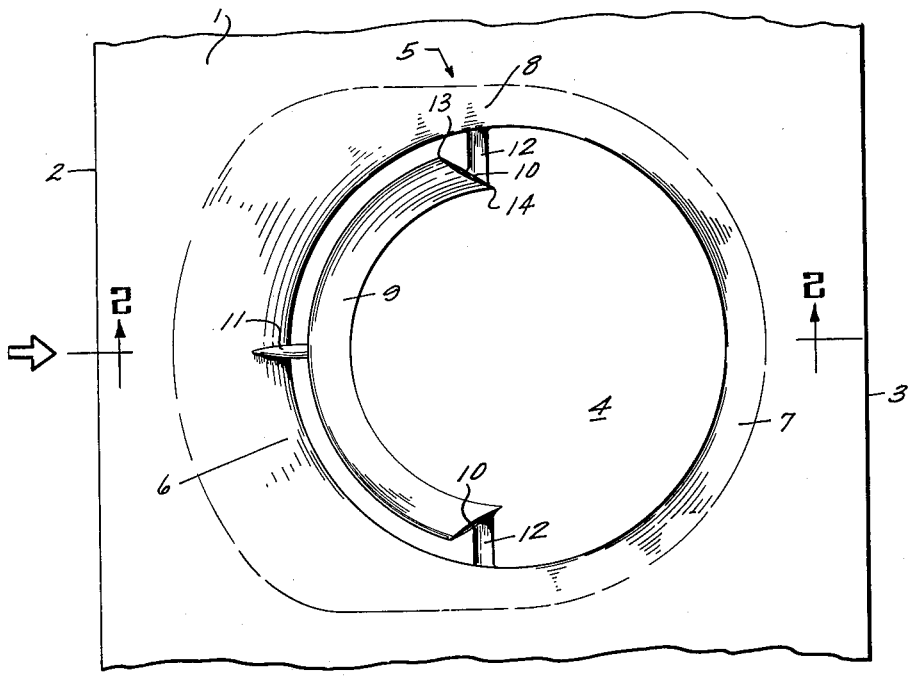
FIGURE 1 is a partial view in plan of an aircraft wing having therein the fan duct inlet of this invention.

Referring to FIGURE 1, a fragmentary portion of an aircraft such as a fuselage or, as illustrated, wing 1 having a leading edge 2 and trailing edge 3 is shown having therein an inlet aperture generally designated at 4, for a vertical thrust fan. The periphery of this inlet is defined by a bellmouth surface, generally designated at 5. Insofar as this aircraft is contemplated as one capable of vertical ascent and descent, and in addition, adapted to perform forward flight, it will be understood that a power plant of suitable type, not shown, is provided to furnish thrust in the forward direction, and to power the fan housed in inlet 4 to furnish vertical thrust. Bellmouth 5 of inlet 4 is provided with a leading portion 6, corresponding to the forward direction of flight, and in the same sense, a trailing portion 7 and intermediate portions 8.

This invention is set forth in the environment of an inlet having a particular bellmouth design, but need not be limited thereto. In this particular bellmouth, the leading portion 6 extends for approximately 30 degrees equi-distantly of each side of its forward mid-point, represented as that point farthest forward in the direction of forward flight. It is to be understood that 30 degrees is not critical but leading portion 6 should be maximized the amount necessary to smoothly fair through intermediate portions 8 into trailing portion 7.

The configuration of bellmouth surfaces may be expressed in terms of the bellmouth ratio, described above as represented by the ratio of the radius of vertical curvature of the bellmouth surface to the diameter of the inlet. In the leading portion above described, the bellmouth ratio is 25 percent. The trailing portion 7 of the inlet extends for approximately 90 degrees equi-distantly of each side of a trailing mid-point, represented as the point farthest to the rear, or diametrically opposite the leading mid-point. In this trailing portion, the bellmouth ratio illustrated is 6 percent. The intermediate portions 8 are blending surfaces fairing together the leading and trailing portions of the bellmouth.

Within the inlet aperture, there in located a vane 9, substantially semi-circular or crescent shaped when viewed in plan, as in FIGURE 1. The curvature of the vane 9, though obviously of smaller mean radius than that of the inlet, conforms generally to the curvature of the inlet bellmouth 5, being radially spaced from the bellmouth wall at an equal distance throughout its periphery. For aerodynamic design, the vane may be of airfoil cross section. The leading edge of the vane 9 is preferably flush with the top surface of the inlet of bellmouth 5, and the trailing edge extends downwardly into the inlet duct. It will be apparent to those skilled in the art that air, flowing over the leading portion 6 of bellmouth 5, will be arrested by the vane 9 and turned downwardly into the inlet 4. A portion of the air entering the inlet is forced to flow between the vane and the wall of the inlet bellmouth, thus preventing the separation of the air from the inlet wall which would occur in the leading portion of the inlet if the vane were not present.

It will be seen that the vane takes the form of a segment, rather than a complete annulus lying within the bellmouth. The degree of segment which the vane assumes is governed by certain considerations. First, it will be apparent that, for strictly vertical flight, the ideal inlet might have no vane whatever. However, since the inlet design must reconcile the requirements of both vertical and forward flight, in accordance with the invention, the vane should be sufficient to perform the turning function described for forward flight, while its size and extent should be minimized to permit optimum inlet flow characteristics when the aircraft is not in forward flight. A second consideration, in accordance with the invention, resides in the fact that, while the concentric vane described tends to direct air into the inlet in the leading portion thereof, the same vane in the trailing portion would tend to spill air upwardly out of the inlet. Thus, an annular vane concentric with the inlet, while producing lift in the leading portion, would produce drag in the trailing portion.

Guided by these considerations and in accordance with this invention, a vane is provided forming only a segment of an annulus, this segment being located in the leading portion of the inlet bellmouth. Best results are obtained when the vane is cut off at a point on either side where the lift coefficient of the vane becomes negligible, or more specifically, where the lift coefficient of the airfoil vane lies between the limits of zero and 0.3. For the conditions of flight to be anticipated, this cut off point can be located geometrically on either side as lying within an arc of between 60 and 120 degrees from the forward or leading mid-point of the vane on either nide of the mid-point.

The ends 10 of the vane 9 are cut off or terminated in such a manner as to provide optimum streamlining. If the ends 10 of the vane 9 are cut off squarely so as to coincide substantially with a radius from the center of the inlet, the effect is to produce turbulence of the air flowing off the ends as it passes over the vane into the inlet. In accordance with the invention, this undesirable turbulence is eliminated by angling the end edges 10 forwardly so as to coincide, generally, with the flow of the air stream entering the inlet during maximum required forward flight.

The end edges 10 are formed to slant forwardly so that the intersection 13 of the end edge 10 with the vane leading edge is forward of the intersection 14 of the end edge 10 with the vane trailing edge.

In accordance with the invention, the vane 9 is suitably attached to the bellmouth 5 of the inlet by, for example, three struts, one at each end of the vane, and one joining the vane and bellmouth at a point in line with the leading mid-point thereof. To minimize the undesirable effects of interaction between the struts and vane and between struts and bellmouth, caused by the passage of the high velocity air stream over these surfaces, these struts are constructed and positioned so as to offer the least possible resistance to the air stream flow into the inlet, and to avoid undesirable phenomena resulting from aerodynamic interaction between strut and adjacent parts. Undesirable effects of interaction are avoided if attachment of the strut members to bellmouth or vane can be made at a point where the air stream is in a condition of acceleration. In the case of the front strut, designated by the numeral 11, attachment of the strut should be in the space between the vane and the bellmouth wall. Since the vane is curved in conformity with the curvature of the bellmouth, the velocity of the air stream over the top of the vane will be high relative to the velocity of the air stream flowing on the underside of the vane. This latter, relatively low velocity, will be either constant or increasing. Therefore, attachment of the forward strut 11 to the vane anywhere on the under, or pressure, side will involve no undesirable effects of interaction, since at no point of this surface is the air stream in a condition of decreasing velocity or deceleration.

In the case of the strut intersections with the bellmouth it should be noted that the air stream over the side, or blended, surface of the bellmouth will be in a condition of acceleration when entering the upper, outer portion. This air stream tends to slow down as it changes direction flowing over the bellmouth and into the inlet. Therefore attachment of the struts to the bellmouth surface should be at a point far enough up the bellmouth surface where the air stream is still accelerating, or far enough down into the bellmouth where the air stream has terminated its deceleration and has reached stable velocity.

Figure 2:
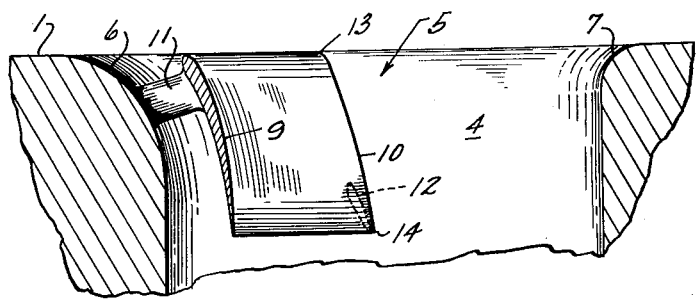
FIGURE 2 is a partial view taken along the line 2—2 of FIGURE 1.

Positioning of the struts to offer the least possible resistance to the air flow is accomplished in the case of the single forward strut 11 by locating it edgewise to the air stream flowing over the leading portion 6 of the bellmouth. Thus, vane 11 in FIGURES 1 and 2 is illustrated as being a relatively flat, vertical strut joining the vane 9 and leading bellmouth surface 6 and attached at a point as high up on the bellmouth radius as possible.

The side struts 12 intersect the vane on its under or pressure surface which is a favorable point of attachment as described above. In addition they intersect the bellmouth well after the air has decelerated. Positioning of the side struts 12 is made with cognizance of the air stream flow in both the hover and forward flight conditions. In the hover condition, the flow will be radially inward, over the bellmouth surface, toward the inlet. In the condition of forward flight, the flow will be substantially rearward over the leading bellmouth surface 6 and into the inlet. It will be apparent that the least resistance to the first mentioned air stream will be afforded by a perfecly vertical strut, as in the case of the leading strut 11. The ideal side strut in the condition of forward flight would be placed at a suitable angle from the vertical. The preferred embodiment reconciles the ideal positioning for both types of flight, as shown in FIGURE 2, by inclining the side struts 12 so as to lie between the vertical and a front inclination. Since the most critical air flow may be in a condition of forward flight, it is preferred to favor the front inclination, rather than the vertical.

It is therefore apparent by the specification preceding that the invention described will provide an inlet for a vertical take-off aircraft which affords a satisfactory flow of air into the duct of the vertical thrust fan, this inlet providing high performance of the aircraft when rising or descending vertically, hovering, or in the transition from forward to vertical flight, and from vertical to forward flight.

Figure 3:
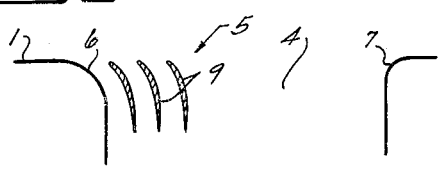
FIGURE 3 is a schematic view of a modified form of the invention.

It will be obvious to those skilled in the art that inlet designs involving more than one vane as schematically shown in FIGURE 3 may use the basic concept of this invention, and although a certain embodiment of the invention has been illustrated and described herein, it is apparent that other changes and modifications may be made in the construction and arrangement of the various parts without departing from the scope of this invention.

What I desire to secure by Letters Patent of the United States is:

1. In a vertical take-off aircraft, a fan duct inlet having a bellmouth, the axis of flow of said inlet being inclined at an angle to the forward direction of flight of said aircraft, said bellmouth having a leading portion in the direction of forward flight, and at least one vane attached to and spaced from a segment of the bellmouth periphery to extend into said bellmouth in the leading portion only thereof.

2. The invention of claim 1 in which said vane is provided with end edges which are formed to slant forwardly.

3. The invention of claim 1 in which struts join said bellmouth and said vane at points where no air flow therebetween decelerates during any condition of flight.

4. In a vertical take-off aircraft, a fan duct inlet having a bellmouth, the axis of flow of said inlet being inclined at an angle to the forward direction of flight of said aircraft, said bellmouth having a leading portion in the direction of forward flight, at least one vane having a leading edge substantially coextensive with the opening of said inlet bellmouth and attached to and spaced from a segment of the periphery of said bellmouth and having a trailing edge extending into said bellmouth in the leading portion only thereof.

5. In a vertical take-off aircraft, a fan duct inlet having a bellmouth, the axis of flow of said inlet being inclined at an angle to the forward direction of flight of said aircraft, said bellmouth having a leading portion in the direction of forward flight, at least one vane attached to said bellmouth and spaced from and substantially conforming to the curvature of a segment of the periphery of said leading portion only.

6. In a vertical take-off aircraft, a fan duct inlet having a bellmouth, said inlet having its axis of flow disposed at an angle to the forward direction of flight of said aircraft, said bellmouth having a leading portion in the direction of forward flight, at least one vane having a leading edge substantially coextensive with the opening of said inlet bellmouth and attached thereto and spaced therefrom to extend about a peripheral segment of between 120 and 240 degrees of said leading portion only.

7. The invention of claim 6 in which struts join said bellmouth and said vane at points where no air flow therebetween will be in a condition of deceleration during any condition of flight.

8. In a vertical take-off aircraft, a fan duct inlet having a bellmouth, said inlet having its axis of flow disposed at an angle to the forward direction of flight of said aircraft, said bellmouth having a leading portion in the direction of forward flight, and a substantially semi-circular vane having a leading edge substantially coextensive with the opening of said inlet bellmouth and attached thereto and spaced therefrom to extend about a peripheral segment of between 120 and 240 degree of said leading portion only.

9. In a vertical take-off aircraft, a fan duct inlet having a bellmouth, said inlet having its axis of flow disposed at an angle to the forward direction of flight of said aircraft, said bellmouth having a leading portion with respect to forward flight of said aircraft, and a substantially semi-circular vane attached to said inlet bellmouth and spaced therefrom and extending through an arc of between 60 and 120 degrees of each side of the mid-point of said leading portion only.

10. In a vertical take-off aircraft, a fan duct inlet having its axis of flow disposed at an angle to the forward direction of flight of said aircraft, said bellmouth having a leading portion with respect to forward flight of said aircraft, and a substantially semi-circular vane attached to said inlet bellmouth and spaced therefrom and extending on each side of the mid-point of said leading portion to a point about the periphery of said bellmouth at which the lift coefficient of said vane is between 0.3 and zero.

11. In a vertical take-off aircraft, a fan duct inlet comprising a bellmouth in which the ratio of radius of curvature of the bellmouth to diameter of the inlet is in the range of 6 percent to 50 percent, said bellmouth having a leading portion in the direction of forward flight, and a substantially semi-circular vane attached in spaced relation to said inlet bellmouth and extending about a circumferential segment of between 120 and 240 degrees of said leading portion only.

12. In a vertical take-off aircraft, a fan duct inlet comprising a bellmouth having a circumferential surface with a leading portion in the direction of forward flight, a trailing portion downstream thereof, and an intermediate portion blending said leading and trailing portions together, in which the ratio of radius of curvature of the bellmouth to diameter of the inlet is 25 percent about a 60 degree segment of said circumferential surface in said leading portion, 6 percent about a 180 degree segment of said circumferential surface in said trailing portion, and a ratio of between 6 and 25 percent in said intermediate portion blending said leading and said trailing portions, and a substantially semi-circular vane attached to the wall of said inlet bellmouth and extending through an arc of between 60 and 120 degrees of each side of the mid-point of said leading portion only.

References Cited in the file of this patent

UNITED STATES PATENTS

| 2,880,945 | Crane | Apr. 7, 1959 |
| 2,997,257 | Kerry | Aug. 22, 1961 |

FOREIGN PATENTS

| 1,186,372 | France | Feb. 23, 1959 |
| 1,204,525 | France | Aug. 10, 1959 |